July 24, 1956 P. V. JONES 2,755,603
METHOD OF AND APPARATUS FOR FORMING LENSES
Filed March 23, 1955 5 Sheets-Sheet 1

INVENTOR.
PAUL V. JONES
BY Carl H. Synnestvedt
AGENT

INVENTOR.
PAUL V. JONES

July 24, 1956 P. V. JONES 2,755,603
METHOD OF AND APPARATUS FOR FORMING LENSES
Filed March 23, 1955 5 Sheets-Sheet 5

INVENTOR.
PAUL V. JONES
BY
Carl H. Synnestvedt
AGENT

United States Patent Office 2,755,603
Patented July 24, 1956

2,755,603

METHOD OF AND APPARATUS FOR FORMING LENSES

Paul V. Jones, Oreland, Pa., assignor to Philco Corporation, Philadelphia, Pa., a corporation of Pennsylvania Application March 23, 1955, Serial No. 496,143

17 Claims. (Cl. 51—131)

The invention hereinafter described and claimed relates to a method of and apparatus for grinding and polishing optical surfaces. More particularly, it relates to a method of and apparatus for producing prisms of the kind used as rotating polygonal lenses.

While the invention may be used for producing various types of optical elements, including prisms, it is particularly adapted for the production of generally toroidal prisms, commonly referred to as "polygons." In addition to other uses, polygons of this type are used in radar equipment and in continuous motion film projectors. The latter are becoming increasingly popular in the projection of motion pictures for television broadcasting, and it is with this apparatus that the invention is chiefly concerned. With the increasing popularity of such projectors comes the need for providing methods and means whereby the polygons used therein can be accurately and inexpensively produced and on a mass production basis.

The polygons may be solid, but for many reasons unimportant here, it has been found that the most popular type is toroidal or ring-shaped, with optical flats, or facets, formed about the outer periphery. The following description, along with the accompanying drawings, makes use of this type of polygon to describe and illustrate the principles of the invention.

The difficulty in forming polygons is the grinding and polishing of each small facet so accurately that the end result provides—with a maximum of angular and radial accuracy—a polygon having a plurality of highly polished, equally shaped facets. It is well known, of course, that grinding and polishing constitute substantially the same process, the only difference being the sizes of the abrasive used and the type of reaction member or "lap" to which the abrasive is applied.

Heretofore polygons have been produced by laborious, inaccurate and time-consuming manual processes, resulting in a very high priced product of doubtful quality. Attempts have been made to reduce the cost and increase the quality of polygons by mechanizing previously known methods, but none have been successful.

It is, therefore, the primary object of this invention to provide a new method of and apparatus for grinding and polishing optical surfaces.

Another and important object of the invention is to provide an improved method and apparatus for manufacturing prisms with such precision as to obtain a maximum of angular and radial accuracy in the end product.

A further object of the invention is to provide such a method and apparatus enabling the manufacture of precise polygons on a mass production basis.

In accordance with the invention, and first briefly described, there is provided a fixture, more commonly and hereinafter referred to as a jig, for holding the optical blank or workpiece in a manner exposing only enough of its periphery to form a facet of the desired size by grinding away the exposed portion. The exposed portion of the workpiece extends through an aperture provided in a glass plate or platform forming a part of the jig and comprising an important part of the invention.

The workpiece is carried upon a rotatably mounted spindle having indexing means for presenting and holding different peripheral portions of the workpiece above the top surface of the glass platform, whereby individual facets can be formed by grinding away the exposed portions with a rotating coarse grit grinding element as the workpiece is indexed to its different positions. Subsequent grinding with the planar surface of a fine grinding lap removes an additional portion of each facet and, importantly, with each facet removes a co-planar portion of the top surface of the glass platform. After the facets are perfectly formed, they are polished simultaneously with the platform.

The area of the glass platform is much larger than the area of each facet, and by grinding each facet and the top surface of the platform simultaneously in the same plane, a maximum of angular and radial accuracy is obtained, as more fully explained hereinafter.

In the overall operation, all of the facets are successively roughed out by a coarse grinding element, after which they and the glass platform are successively subjected to coplanar fine grinding and polishing. The presentation of successive portions of the workpiece through the aperture in the glass platform is controlled by indexing means which determines the angle of rotation of the workpiece in accordance with the number of facets to be formed, and the method and apparatus of the invention enables the formation of prismatic polygons of extreme accuracy and precision.

During the development of this invention, many different methods and apparatus for forming polygons were investigated, but the method and apparatus briefly described above, and more fully described below, is the only way known to the inventor that precision polygons have been successfully manufactured on a production basis.

The foregoing objects, advantages and features of the invention will be fully understood from a consideration of the following description taken together with the accompanying drawing, in which.

Figure 2:
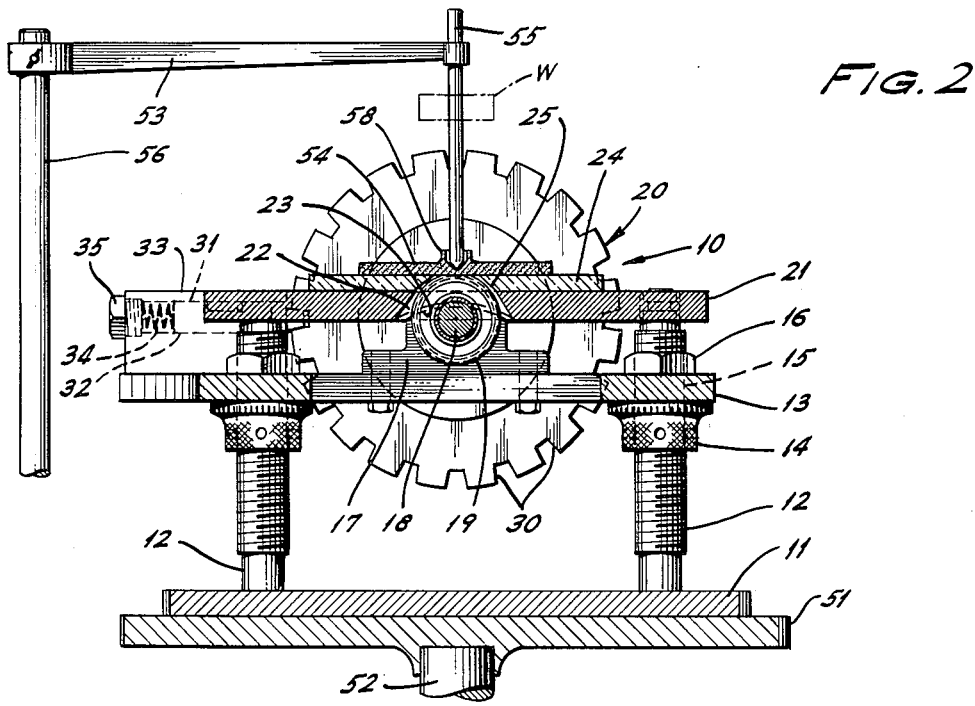
Figure 2 is a fragmentary sectional view of a fine grinding and polishing machine and shows the apparatus of the invention in position thereon.
Figure 3:
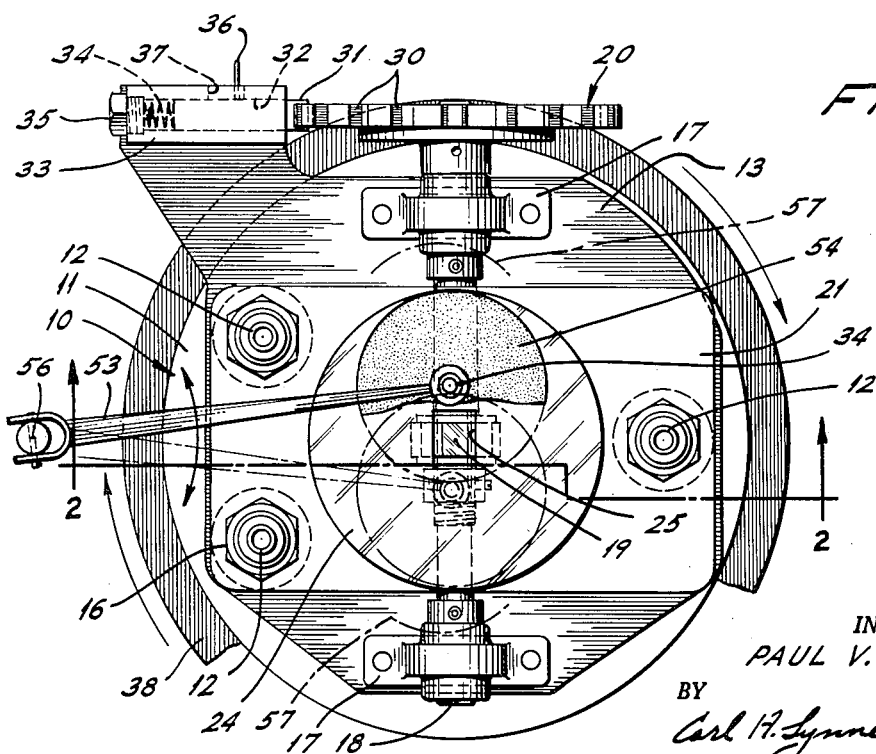
Figure 3 is a top plan view of the apparatus shown in Figure 2.
Figure 8:
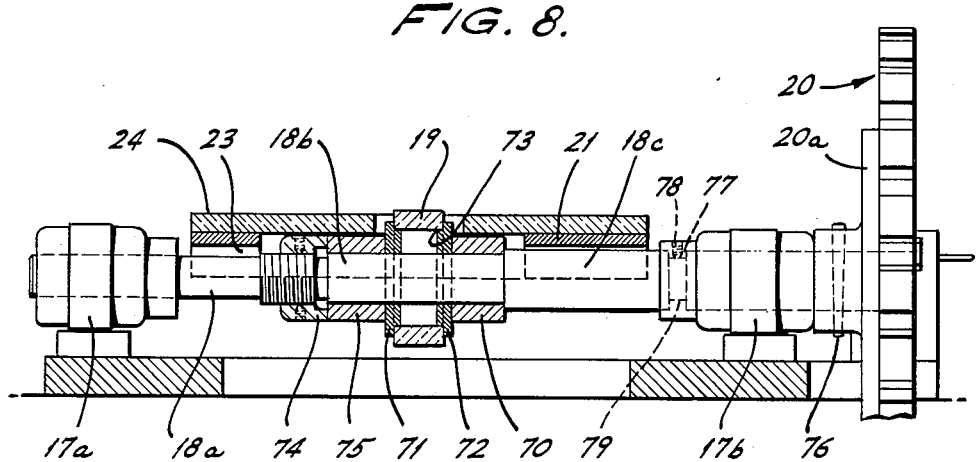
Figure 8 is a fragmentary sectional view taken substantially along line 8—8 on Figure 3.

More specifically, and with reference to Figures 2 and 3, it will be seen that the apparatus for carrying out the method of the invention, as herein illustrated, includes a jig 10, having a base plate 11 upon which is secured three upstanding threaded studs 12, supporting a table 13 in spaced relation to the base plate 11, as by calibrated or graduated nuts 14. These nuts provide means for adjusting and leveling the position of table 13 relative to base plate 11. Studs 12 extend through apertures 15 in the table, the latter being securely held in its adjusted position as by lock nuts 16. A pair of journal blocks 17 are mounted upon table 13 and rotatably support a spindle 18 which carries optical workpiece 19 and indexing wheel 20. The details of the spindle assembly are seen in Figure 8, described below.

Also supported on studs 12, above table 13, in spaced relation therewith and parallel with base 11, is a second table 21 having a central aperture 22 through which workpiece 19 extends. The underside of table 21 is grooved in the region indicated by the numeral 23 thus to provide clearance for spindle 18. Secured to the top of table 21 is a disc shaped platform 24 having a central aperture 25 of rectangular configuration concentrically located with respect to similarly shaped aperture 22 in table 21.

Figure 5:
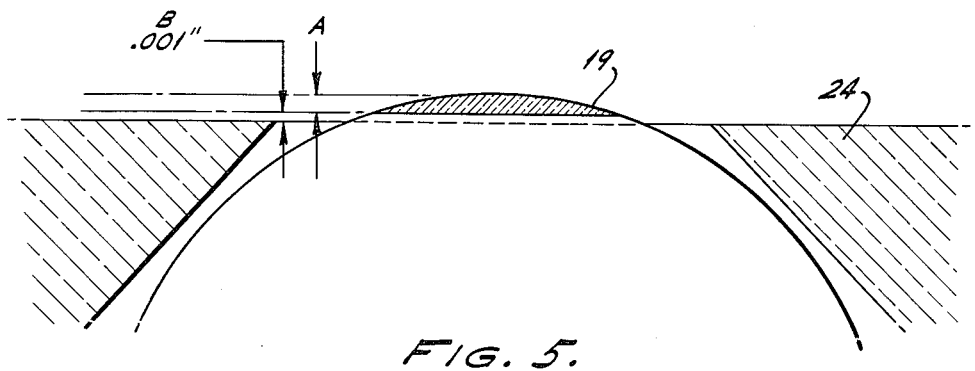

While platform 24 may be of other suitable materials, it has been found that "Pyrex" type glass is most satisfactory as it has about the same degree of hardness as the material from which the polygon is to be made. As seen in Figure 5, only a small portion of the periphery of the workpiece 19 is presented above the upper surface of platform 24, and exposed to the action of a grinding element.

Figure 9:
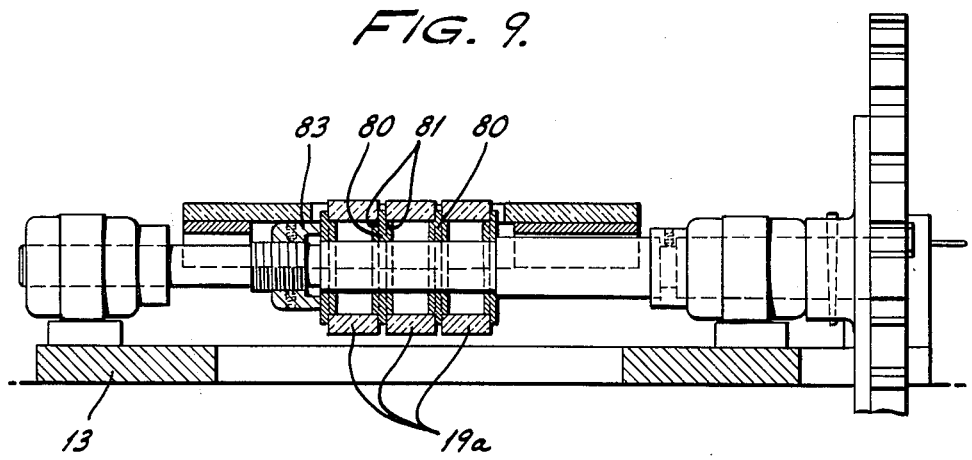
Figure 9 is a view similar to Figure 8 but showing a modified form of the apparatus in which a plurality of workpieces may be mounted on the jig.

It will be understood, of course, that while only one workpiece has been shown for simplicity of illustration and description, with only slight modification in apertures 22 and 25, and parts of the spindle assembly, as shown in Figure 9, a plurality of workpieces may be mounted on spindle 18.

Indexing wheel 20 is provided with a plurality of recesses 30 which receive the indexing element or bolt 31, slidably mounted in a bore 32 in an upstanding portion 33 of table 13. Indexing bolt 31 normally is biased to its extended position, as clearly shown in Figure 3, by a spring 34 urged against the end of the bolt as by spring tension adjusting nut 35, but may be retracted as by pin 36 projecting through slot 37 in portion 33. Indexing wheel 20 preferably is provided with a number of indexing stations 30 equal to the number of facets desired on the polygon, twenty in this case.

Figure 1:
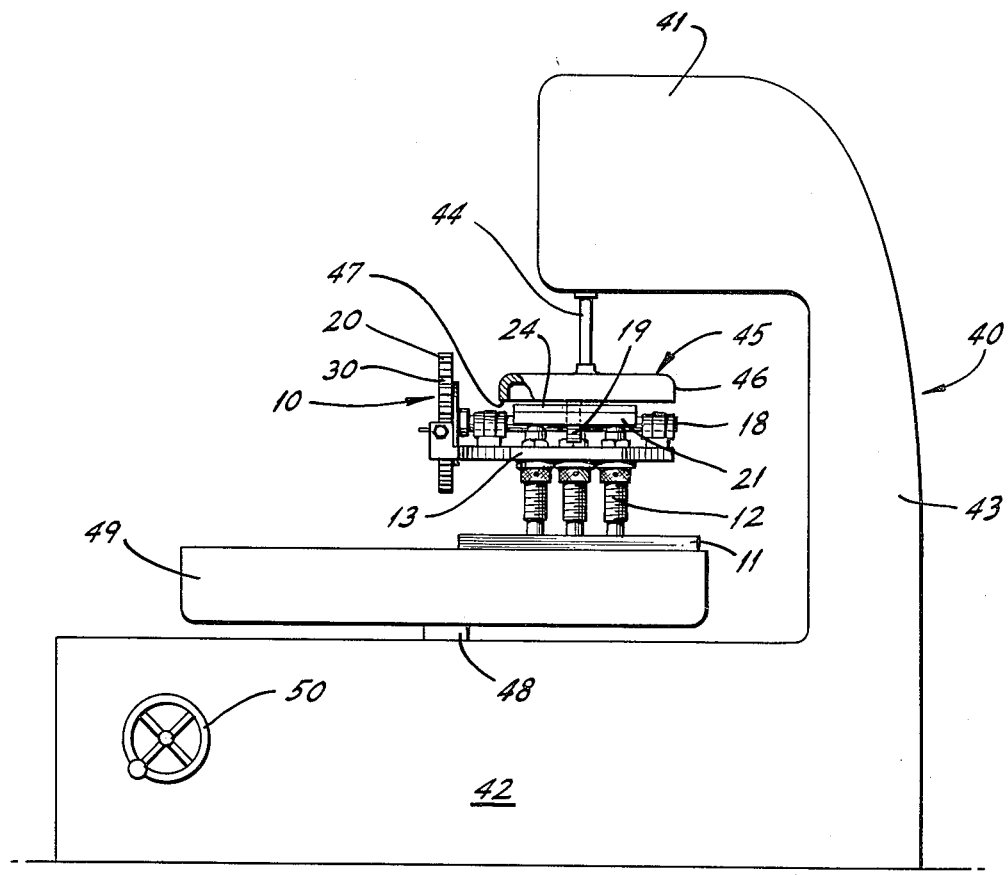
Figure 1 is an elevational view of a coarse grinding machine having the apparatus of the invention mounted thereon.
Figure 4:
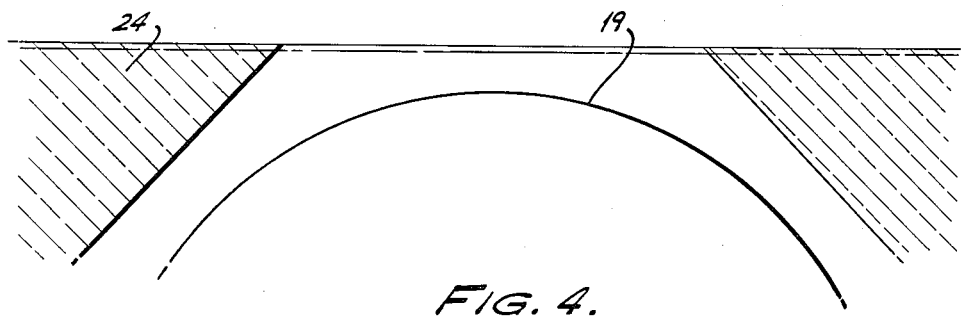
Figures 4, 5 and 6 are diagrammatic views illustrating portions of the progressive steps in the method of the invention.

In carrying out the method of the invention, it is first desirable to determine the rate of cutting or grinding of the platform 24 by subjecting it to grinding operations without the workpiece in position to be ground, as indicated diagrammatically in Figure 4. While determining the rate of cutting, the platform also is leveled so that subsequent operations on the workpiece will be uniform. The first step in determining the grinding rate is normally accomplished on the same grinder which is used for the first steps in the method of the invention. The well known Blanchard grinder is admirably suited for this purpose. It is a rugged, stable machine and, as seen in Figure 1, comprises a heavy C-shaped frame 40, including an upper arm 41, a base 42, and an upright shaft 43. Rotatably supported in arm 41 is a shaft 44 extending downwardly beneath upper arm 41. Fixed to the lower end of the shaft is a cylindrical grinding element 45 having a peripheral downwardly extending flange 46, the lower edge 47 of which carries the abrasive. The diameter of the grinding element preferably is larger than the diameter of platform 24 which, in this illustrated embodiment of the invention, is six inches. Mounted on a rotatable shaft 48 in base 42 is a turntable 49, the axis of which is parallel with, but adjustable relative to the axis of shaft 44, as by crank 50.

In positioning the jig 10 on turntable 49, the jig is set so that the center of indexing wheel 20 is adjacent to or on the axis of shaft 48, the latter being so adjusted relative to grinding element 45 that, as the turntable revolves, the grinding element will contact only the top surface of the platform. With each complete rotation of turntable 49, the grinding element sweeps across the whole top surface of the platform 24 removing an extremely thin layer thereof.

The Blanchard grinder is used with a fast, rough abrasive which leaves a random pattern of grinding marks in the surface of the platform, which are removed during the fine grinding and polishing. Preferably a different grinder is used for the latter steps, elements thereof being seen fragmentarily in Figures 2 and 3, and described in more detail below. Removal of the rough grinding marks by this subsequent step can now be observed and, from this observation, the time necessary during the fine grinding operation to remove such marks from the workpiece may be determined. This "basic time" element enables the operator to make a good estimate as to the amount of material to be removed from the facet (as determined by the radial displacement of the facet from the principle axis of the polygonal lens), during the rough grinding operation, and will determine how far the polygon spindle must be set below the initial level of the glass platform for subsequent operations. After these are established, the jig may be returned to the Blanchard grinder and platform 24 again leveled in preparation for the first grinding step on the workpiece.

The method now proceeds in accordance with the steps described below.

The spindle assembly, including the workpiece 19, is first mounted on the jig and carefully adjusted as by calibrated adjustment nuts 14 so that its axis is the proper distance below the platform and the right amount of the workpiece extends above the platform to permit the desired optical flats or facets to be formed. Alternatively, the spindle assembly may be mounted on the jig from the beginning, but in a lowered position, as indicated in Figure 4. After the "basic time" of grinding has been established, it can then be raised into grinding position. In either case, with this type of polygon, care must be taken to position the spindle with its axis on a plane parallel with the plane of the glass platform. The jig is then placed on the Blanchard grinder.

Figure 7:
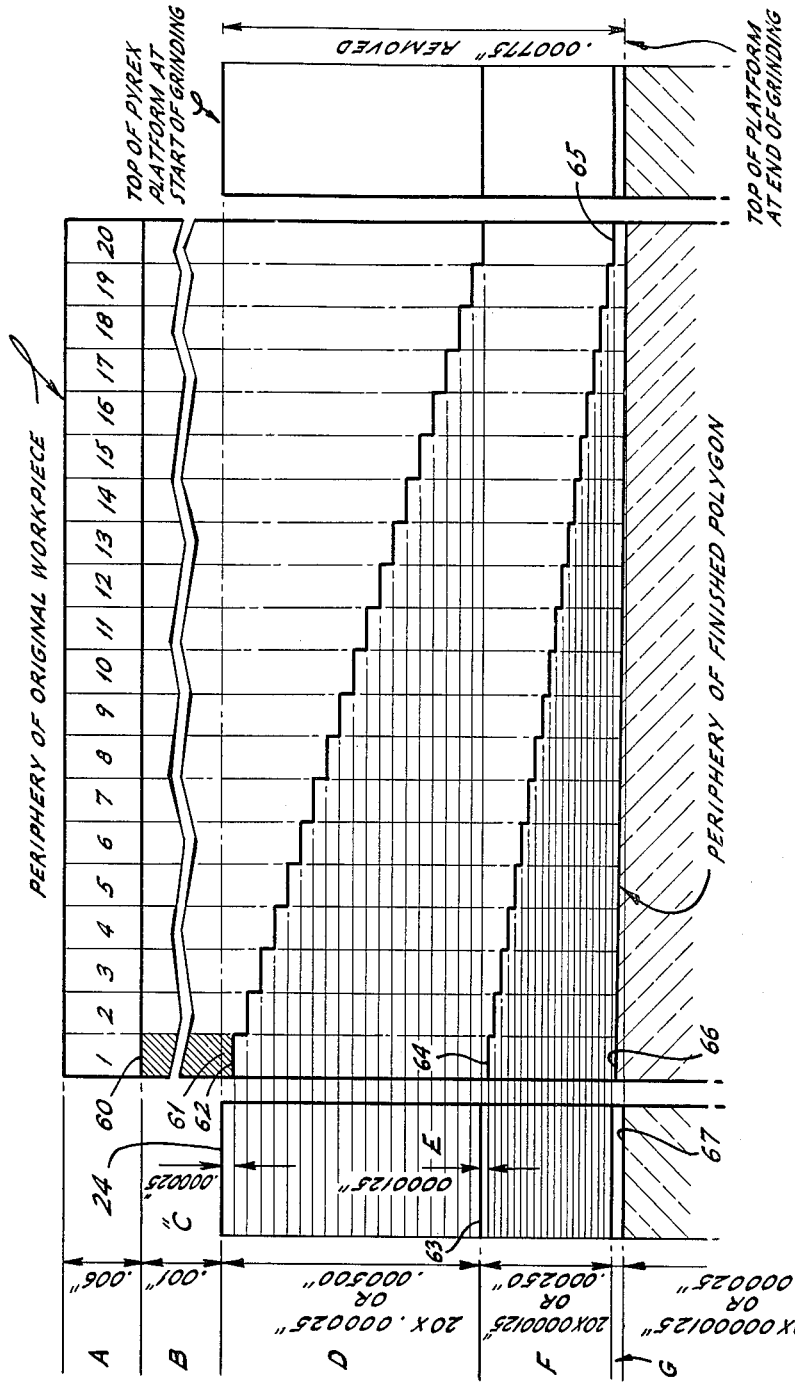
Figure 7 is a graphic presentation of the method steps of the invention.

As illustrated at A in Figures 5 and 7, about .006" is removed from the first facet leaving it .001" above the top surface of the platform 24, and on a plane parallel with the plane of the top surface of the platform. After the first, or No. 1 facet is formed, index bolt 31 is retracted, the spindle is rotated to the next station and the rough grinding is repeated on the newly presented portion of the workpiece, thus to form the second, or No. 2 facet. This operation is repeated sequentially until all twenty facets are formed around the periphery of the workpiece. It should be understood that the surface of platform 24 is not touched during this grinding cycle (once around the workpiece). The fixture is then removed from the Blanchard grinder and installed upon the fine grinding and polishing machine, as shown in Figures 2 and 3.

The fine grinder (Figures 2 and 3) includes a large turntable 51 mounted upon a shaft 52 and rotated by suitable means not shown. Above the turntable is an oscillating arm 53 for driving the grinding disc or lap 54, as by shaft 55, the latter being slidably received in the end of arm 53. Oscillation of lap 54 is obtained by driving shaft 56 through similar movements by well known means not shown. The oscillations are of such magnitude that lap 54 sweeps across the whole top surface of platform 24 as the latter rotates beneath the lap so that, during its operation, the top of platform 24 and the upwardly presented surface of the facets lie in a true horizontal plane, reducing angular error to a minimum. Preferably a portion (about ¼ diameter) of the lap sweeps beyond the edge of platform 24, as indicated by the broken lines 57 on Figure 3. The end of shaft 55 engages the lap by mere insertion into socket 58, Figure 2, whereby the lap is permitted to seek its own level during operation thereof. If desired, a weight, as indicated in broken lines at W in Figure 2, may be added to shaft 55 to increase the rate of grinding.

Figure 6:
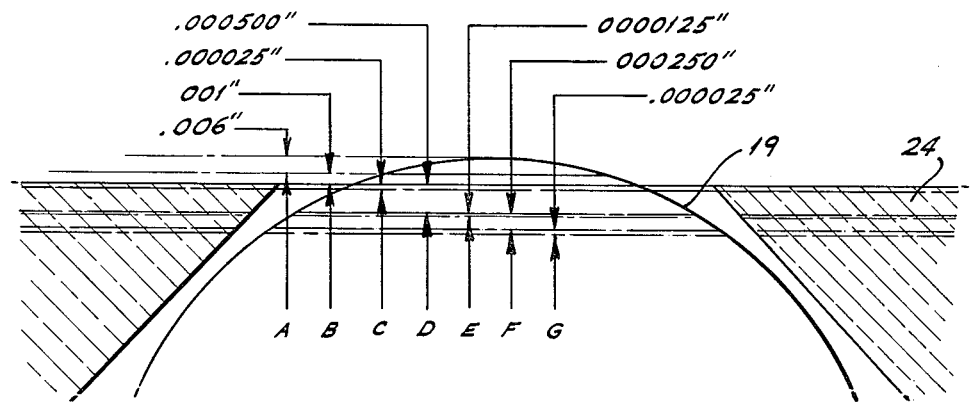

With reference to Figures 4, 5, 6 and 7, it should be understood that the first three of these figures have been enlarged and distorted in a manner more clearly to show the thickness dimensions of the material being removed. Considering specifically Figures 6 and 7 which are, respectively, diagrammatic and graphic illustrations of the method steps of the invention. Figure 6 diagrams the steps as they affect one facet and the platform, while Figure 7 shows the method steps as they affect the whole polygon and the platform. For convenience of illustration, the workpiece in Figure 7 is represented as though it had been straightened into a bar.

Based on the preliminary operation described above, to determine the "basic time" of grinding platform 24, the No. 1 facet will now be ground for a time sufficient to remove the .001" extending above the table (see dimension B) and then to remove 25 millionths of an inch simultaneously from the facet and the platform surface (see dimension C of Figures 6 and 7). Because the facet, owing to its smaller area, will grind about 100 times faster than the platform surface, it will quickly be reduced to the platform level (see dimension B), and thereafter both it and the platform will grind together at the same rate for the necessary time to remove only 25 millionths inch (.000025") from the table (see dimension C). Thus a total of .001025", dimension B plus C, the shaded area on Figure 7 is ground from the workpiece in forming No. 1 facet.

The grinding of the platform surface is the most important step in the method. It is the step by which the angular error prevalent in previously known systems has been reduced to a minimum.

It is to be understood, of course, that during the short time the facet is extending above the platform, and by reason of the type of suspension of lap 54, the facet may grind angularly and produce what is commonly referred to as "pyramid" error. In other words, the opposite side edges of the facet spanning the width of the workpiece are converging instead of being parallel as they should be. However, the lap quickly bottoms on the platform surface and subsequent grinding (.000025") is then "true" or parallel with the axis of the spindle, and the "pyramid" condition, if any, is eliminated.

Each subsequent new facet, as it is presented during this grinding cycle will extend above the platform surface .000025" more than the preceding facet and, therefore, the time necessary to grind down each succeeding facet, including the .000025" from the platform will be increased by the time necessary to remove the additional .000025". In other words, and looking at Figure 7, the line 60 at the top of dimension B represents the top of all twenty facets (see numbering above this line) after the rough grinding on the Blanchard grinder. Now looking at facet No. 1, it will be seen that it is ground through .001" (dimension B) down to line 61 which represents the plane of the top of platform 24, and additionally it is ground simultaneously with the top of the platform .000025" (dimension C) to line 62. Facet No. 2 now is .000025" higher above the top surface of platform 24 than was facet No. 1 when fine grinding was started on it and, therefore, facet No. 2 will have to be ground for the additional time necessary to remove the extra .000025". Following this through to facet No. 20, it will be seen that the time for removing the extra .000025" must be multiplied by nineteen. This fact, of course, is taken into consideration when calculating the grinding cycle so that during the grinding of each facet, .000025" is ground from the platform surface for the reason stated above. It should be kept in mind, of course, that the mentioned grinding time, because of the minute dimensions of the material being removed, are of extremely short duration.

Preferably the facets are ground sequentially until all have been formed, at which time the platform surface will have been ground down a total of 500 millionths of an inch (see dimension D) to line 63 on Figure 7. After the last or twentieth facet is ground, the fixture is reindexed to again present the No. 1 facet. Because 500 millionths of an inch have been ground from the platform, facet No. 1, which is still at line 62, projects 475 millionths of an inch (dimension D minus dimension C) above the top surface 63 of the platform. While not necessary under normal conditions, if all rough grinding marks have not been removed, the above cycle may be repeated using the same basic grinding time (i. e. the time necessary to remove .000025" from the platform), and again grinding all twenty facets. This cycle is not indicated in the drawings.

As the next step in the method, a further trip or grinding cycle around the polygon is made using only half the "basic time" per facet. This will result in a radius differential between the first facet, line 64, and the last facet, line 65, of half the previous differential or only 237 millionths of an inch (.000237", dimension F minus dimension E). This is necessary in order to hold the required angular tolerance, since 500 millionths in 3" (the preferred radius of the platform) amounts to a potential angular error of 34 seconds, which is undesirable.

If desired, a still finer grade of grinding may follow, using the same general principle, and using the same grinding time per facet (½ basic time) as was used with the last cut of the coarser grade. This will remove less material of course, due to the finer grade. This cycle is not shown in the drawing.

To make polishing easier, it is desirable, although not necessary, that a final trip be taken around the polygon at ⅟₂₀ of the basic grinding time for each facet. This will reduce the differential between the radius of the first and that of the twentieth facet to a little less than 25 millionths inch or about one wave (see dimension G), an amount which is inconsequential. Polishing can now proceed.

Starting again with No. 1 facet which stands approximately, but a little less than 25 millionths inch above surface 67 (Figure 7) of the Pyrex platform, at line 66, all of the facets are polished in turn. Facet 20 is flush with the top surface of platform 24 but there is no need to adjust the spindle lower than this facet, for by the time it is reached, the platform should be completely polished, and therefore lower than facet 20 by the amount removed from the platform in polishing the preceding 19 facets. The polishing cycle is not shown on the drawing.

Having now described the preferred method and apparatus of the invention, it is apparent that certain modifications of the apparatus, as well as those indicated above, with reference to the method, fall within the scope of the invention. For example, Figure 8 shows the spindle assembly with a single workpiece 19, while Figure 9 shows how the jig assembly can be modified to accommodate a plurality of workpieces 19a, three being shown in this figure.

More specifically, as shown in Figure 8, the spindle 18 comprises the progressively larger diameter portions 18a, 18b, and 18c. The portions 18a and 18c are journalled in blocks 17a and 17b, while the intermediate portion 18b, which is wide enough to accommodate three workpieces, as shown in Figure 9, has only one workpiece 19 mounted thereon. The mounting means includes sleeve 70, washers 71 and 72 having peripheral recesses 73 for supporting and tightly gripping the inner periphery of the ring-like workpiece, nut 74 and sleeve 75 for applying the clamping pressure against washer 71. The spindle assembly is held against axial displacement by staking hub 20a of indexing wheel 20 to the spindle as at 76, and holding it snugly against the right hand side of journal block 17b, as by sleeve 77 secured snugly against the other side of block 17b as by set screw 78 engaging the spindle in a recess 79.

The spindle assembly seen in Figure 9 has been modified to carry three workpieces, by discarding sleeves 70 and 75, and by introducing two additional washers 80 having peripheral recesses 81 to support the middle workpiece and the inner sides of the two end workpieces. If desired, washers 81 may be eliminated by cementing the workpieces together.

Figure 10:
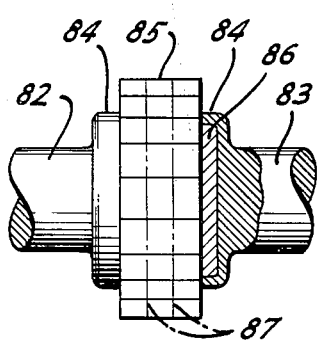
Figure 10 is a fragmentary view of another modification in which solid workpieces may be mounted on the jig.

Solid rather than ring-like polygons are used extensively in delay lines for radar equipment, and the apparatus of the invention may be modified still further, as seen in Figure 10, to accommodate such solid workpieces. The spindle may comprise two separate pieces 82 and 83 having opposing disc-like flanges 84 on their inner ends, the solid workpiece 85 being secured between the opposing faces of the flanges as by pitch 86 or other suitable means. If desired, a plurality of such workpieces may be ground simultaneously by cementing them together, as indicated by the broken lines 87.

While the invention has been described in connection with the manufacture of polygons having rectangular facets with a minimum of pyramidal error, it should be understood that the method and apparatus aspects of my invention are equally useful in forming polygons having facets deliberately made pyramidal in shape. This may easily be accomplished by arranging the axis of spindle 18 angularly with respect to the plane of the top surface of platform 24, and then following the method steps described above.

From the foregoing description, it will now be seen that the invention described above provides a novel method of and apparatus for accurately grinding and polishing optical surfaces and, specifically, the surfaces which define a polygonal prismatic lens.

What is claimed is:

1. The method of forming an optically flat surface on an optical workpiece, comprising: positioning the workpiece beneath the planar top surface of a platform with a portion of said workpiece extending through an aperture in said platform; grinding said portion until it is flat and co-planar with said top surface; and then grinding both said flat surface and said top surface simultaneously.

2. The method of forming an optically flat surface on a workpiece of optical glass, comprising: positioning the workpiece beneath the planar top surface of a glass platform with a portion of said workpiece extending through an aperture in said platform; grinding said portion only, to form a flat surface on said workpiece; grinding said flat surface with a planar grinding element until said top surface and said flat surface are co-planar; and finally grinding said top and flat surfaces simultaneously and without disturbing their co-planar relationship.

3. The method of forming an optically flat surface on an optical workpiece, comprising: positioning said workpiece beneath the planar top surface of a Pyrex glass platform with a portion of said workpiece extending through an aperture in said platform; rough grinding said portion only, to form a flat surface on said workpiece; fine grinding said flat surface until it is co-planar with said platform surface; subsequently grinding both said platform surface and said flat surface simultaneously with a planar grinder; and finally polishing said surfaces.

4. The method of forming a polygonal prismatic lens from an optical workpiece, comprising: positioning the workpiece beneath the planar top surface of a platform having an aperture therethrough; rotating said workpiece through a plurality of predetermined angles to present through said aperture different peripheral portions of said workpiece; individually grinding said portions to the same plane as said top surface as said portions are presented through said aperture; and subsequently grinding each of said portions with said top surface for a predetermined time.

5. The method of forming a polygonal prismatic lens from an optical workpiece, comprising: positioning the workpiece beneath the planar top surface of a platform, with a peripheral portion of said workpiece extending through an eperture in said platform; grinding said portion only to form a facet; rotating said workpiece through a plurality of predetermined angles to present different peripheral portions of said workpiece for grinding, until the periphery of said workpiece comprises a plurality of adjoining facets; and then repeating the rotating steps to present the facets individually through said aperture, while grinding each facet together with the top surface of said platform, for a predetermined period of time.

6. The method of forming a polygonal prismatic lens from an optical workpiece, comprising: positioning the workpiece beneath the planar top surface of platform with a portion of said workpiece extending through an aperture in said platform; rotating said workpiece about a fixed axis and through a plurality of predetermined angles successively to present different peripheral portions of said workpiece through said aperture; rough grinding each of said portions only, to form a plurality of adjoining facets around the periphery of said workpiece; again rotating said workpiece through the same predetermined angles to present said facets sequentially through said aperture, while fine grinding each of said facets until it is co-planar with said platform surface; then grinding each of said facets with said surface for a predetermined basic time; and finally rotating said workpiece through the same predetermined angles and polishing each of said facets individually with said surface.

7. The method of forming a polygonal prismatic lens from an optical workpiece, comprising: positioning the workpiece beneath the planar top surface of a platform with a portion of said workpiece extending through an aperture in said platform; rotating said workpiece through a plurality of predetermined angles successively to present different peripheral portions of said workpiece through said aperture; grinding each of said portions only, as it is presented, to form a plurality of adjoining facets around the periphery of said workpiece; rerotating said workpiece through the same predetermined angles to present said facets through said aperture while grinding each of said facets until it is co-planar with said platform surface; grinding each facet with said surface for a predetermined basic time while maintaining said co-planar relationship; and again rotating said workpiece while again grinding each of said facets with said top surface for a lesser predetermined basic time, maintaining said co-planar relationship.

8. In apparatus for producing prisms from a workpiece of optical glass, said apparatus comprising: a jig including a platform at least as hard as said workpiece, said platform having a planar top surface with an aperture therethrough; rotatable means beneath said platform for supporting said workpiece and presenting peripheral portions thereof through said aperture; and means for indexing said rotatable means to present predetermined different peripheral portions of said workpiece through said aperture.

9. In apparatus for producing prisms from a workpiece of optical glass, said apparatus comprising: a jig including a platform of substantially the same hardness as said workpiece, said platform having a planar top surface with an aperture therethrough; rotatable means beneath said platform for supporting said workpiece and presenting peripheral portions thereof sequentially through said aperture; means to adjust the axis of said last means relative to the planar top surface of said platform; and means for indexing said rotatable means thereby to present different predetermined peripheral portions of said workpiece through said aperture.

10. In apparatus for grinding and polishing glass prisms, said apparatus comprising: a jig including a glass platform having a planar top surface with an aperture therethrough; rotatable means positioned beneath said platform for supporting a workpiece and presenting peripheral portions thereof through said aperture, said last means having its axis on a plane parallel with the planar top surface of said platform; and means for indexing said rotatable means thereby to present different predetermined peripheral portions of said workpiece through said aperture.

11. Apparatus for producing polygons from a workpiece of optical glass, said apparatus including: a jig comprising a platform of a hardness at least as great as said workpiece and having a planar surface with an aperture therethrough; rotatable means positioned beneath said platform for supporting said workpiece and presenting peripheral portions thereof through said aperture, said last means having its axis in a plane parallel with the plane surface of said platform; means for indexing said rotatable means to present different peripheral portions of said workpiece through said aperture; and means for grinding said peripheral portions co-planar with said surface.

12. Apparatus for producing polygons from a workpiece of optical glass, said apparatus including: a jig comprising a glass platform having a planar surface with an aperture therethrough; a spindle rotatably mounted beneath said platform and supporting said workpiece in a manner to present peripheral portions of said workpiece through said aperture, said spindle having its axis on a plane parallel with the planar surface of said platform; means for indexing said spindle to present successive peripheral portions of said workpiece through said aperture; and means for grinding said peripheral portions of said workpiece, as they are presented through said aperture, co-planar with said surface.

13. Apparatus for producing polygons from a workpiece of optical glass, said apparatus including: a jig comprising a Pyrex glass platform having a planar surface with an aperture therethrough; a rotatable spindle positioned beneath said platform and supporting said workpiece in a manner to present a peripheral portion of said workpiece through said aperture, said last means having its axis on a plane parallel with the planar surface of said platform; and means for indexing said spindle to present different predetermined peripheral portions of said workpiece through said aperture; and means for grinding each of said peripheral portions of said workpiece, as it is presented through said aperture, with said surface and until it is co-planar with said surface.

14. In the art of manufacturing polygonal prismatic lenses, the method which comprises: positioning a workpiece adjacent a working surface, a portion of the exterior periphery of said workpiece extending through an aperture provided in said working surface; removing material from said portion until it is co-planar with said working surface; effecting angular rotation of said workpiece to present another portion thereof through the aperture in said working surface; removing material from said other portion until it is co-planar with said working surface; and continuing the alternate material-removing and rotation steps until the desired number of facets have been formed about the exterior periphery of said workpiece.

15. In the art of manufacturing polygonal prismatic lenses, the method which comprises: positioning a workpiece adjacent a working surface; a portion of the exterior periphery of said workpiece extending through an aperture provided in said working surface; grinding said portion until it is co-planar with said working surface and until a minute amount of material has been removed from said working surface; effecting angular rotation of said workpiece to present another portion thereof through the aperture in said working surface; grinding said other portion until it is co-planar with said working surface and until the minute amount of material has been removed from said working surface; and continuing the alternate grinding and rotating steps until the desired number of facets have been formed about the exterior periphery of said workpiece.

16. In the art of manufacturing polygonal prismatic lenses, the method which comprises: positioning a workpiece adjacent a working surface, said workpiece having generally the shape of a figure of revolution and a portion of the curved exterior surface of said workpiece extending through an aperture provided in said working surface; removing material from said portion until it is co-planar with said working surface; effecting angular rotation of said workpiece about its principle axis to present another portion thereof through the aperture in said working surface; removing material from said other portion until it is co-planar with said working surface; and continuing the alternate material removing and rotating steps until the desired number of facets have been formed about the exterior periphery of said workpiece.

17. In the art of manufacturing polygonal prismatic lenses, the method which comprises: positioning a generally cylindrical glass workpiece adjacent table structure presenting a working surface having a hardness at least as great as that of said glass workpiece, a portion of the exterior surface of said generally cylindrical workpiece extending through an aperture provided in said working surface; removing material from said portion until it is co-planar with said working surface and until a minute amount of material has been removed from said working surface; effecting angular rotation of said generally cylindrical workpiece about its principle axis to present another exterior surface portion thereof through the aperture in said working surface; removing material from said other portion until it is co-planar with said working surface and until a minute amount of material has been removed from said working surface; and continuing the alternate removing and rotating steps until the desired number of facets have been formed about the exterior periphery of said workpiece.

References Cited in the file of this patent

UNITED STATES PATENTS

| | | |
|---|---|---|
| 990,524 | Chalmers et al. | Apr. 25, 1911 |
| 1,221,858 | Hollands | Apr. 10, 1917 |
| 2,297,306 | Kousin | Sept. 29, 1942 |
| 2,383,755 | Wilcox | Aug. 28, 1945 |
| 2,408,496 | Watkins et al. | Oct. 1, 1946 |
| 2,424,835 | Luckey et al. | July 29, 1947 |
| 2,441,832 | Morawski | May 18, 1948 |
| 2,449,459 | Eckert | Sept. 14, 1948 |
| 2,549,147 | Walters | Apr. 17, 1951 |